United States Patent [19]

Lieber et al.

[11] Patent Number: 5,159,399
[45] Date of Patent: Oct. 27, 1992

[54] MEASURING DEVICE FOR AN OPTICAL MEDIUM HAVING A LIGHT RECEIVER GUIDABLE TO EITHER OF TWO MEASURING LOCATIONS

[75] Inventors: Winfried Lieber, Krailling; Manfred Loch, Kaiserslautern, both of Fed. Rep. of Germany

[73] Assignee: Siemens Aktiengesellschaft, Munich, Fed. Rep. of Germany

[21] Appl. No.: 737,691

[22] Filed: Jul. 30, 1991

[30] Foreign Application Priority Data

Oct. 4, 1990 [DE] Fed. Rep. of Germany ....... 4031452

[51] Int. Cl.[5] ................... G01N 21/84; G01N 21/59
[52] U.S. Cl. ................................................ 356/73.1
[58] Field of Search ....................................... 356/73.1

[56] References Cited

U.S. PATENT DOCUMENTS

| 4,652,123 | 3/1987 | Neumann | 356/73.1 |
| 4,671,653 | 6/1987 | So et al. | 356/73.1 |

FOREIGN PATENT DOCUMENTS

3828604A1 3/1990 Fed. Rep. of Germany.

Primary Examiner—Vincent P. McGraw
Attorney, Agent, or Firm—Hill, Van Santen, Steadman & Simpson

[57] ABSTRACT

A measuring device for an optical medium employs a single, common receiver which is allocated to either of two transmitters which are stationarily attached to the measuring device at a distance from one another. The common receiver is held at the measuring device by a mechanical displacement guide such that it can be optionally positionally allocated to one of the two respective transmitters.

19 Claims, 3 Drawing Sheets

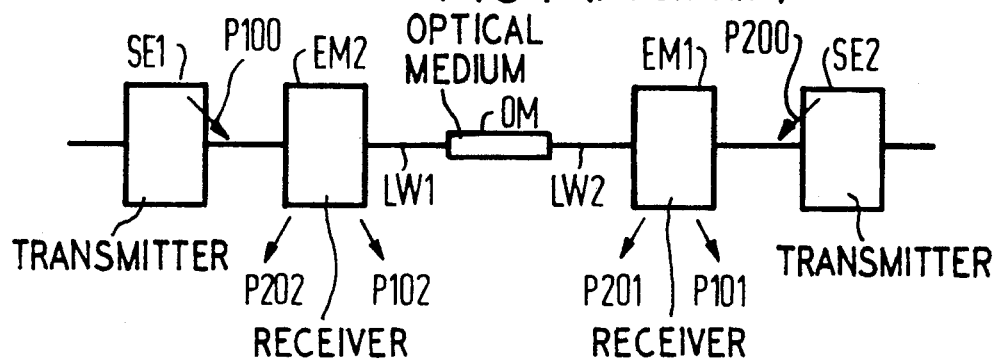
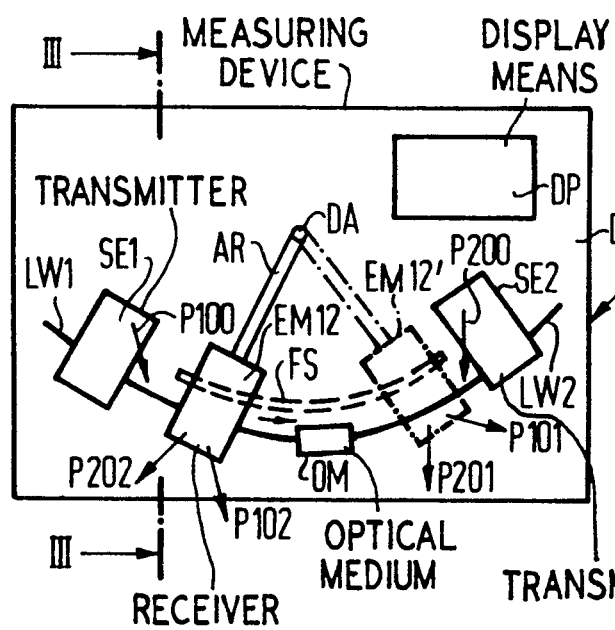
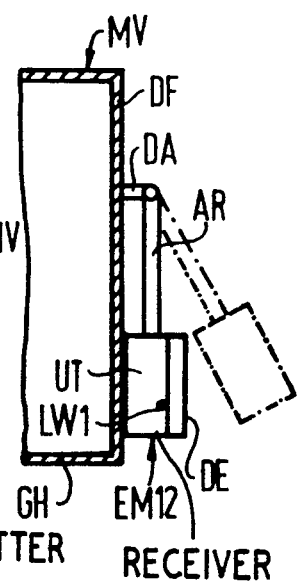

MEASURING DEVICE FOR AN OPTICAL MEDIUM HAVING A LIGHT RECEIVER GUIDABLE TO EITHER OF TWO MEASURING LOCATIONS

BACKGROUND OF THE INVENTION

The invention is directed to a measuring device for an optical medium upon employment of two transmitters that can be coupled to the optical medium at both sides thereof.

A measuring device of this type is disclosed by German Published Application 38 28 604, corresponding to pending U.S. Ser. No. 394,114, now U.S. Pat. No. 5,078,489, filed Aug. 15, 1989 and by U.S. Pat. No. 4,652,123, both incorporated herein, whereby the measuring principle shall again be set forth in brief below with reference to FIG. 1.

An optical medium OM in, for example, the form of a splice location, of a coupler, of a light waveguide with a longer length, of a light waveguide cable, or of some other passive optical component, should have its transmission properties measured, whereby it is particularly the attenuation that is of interest. For this purpose, two optical transmitters SE1 and SE2 are provided, these being arranged at both sides of the optical medium (unit under test) OM and being in communication with this optical medium via light waveguides LW1 and LW2. When the optical medium itself is already a light waveguide, or contains such a light waveguide, of course, the respective light waveguide ends of the optical medium can be directly co-employed as light waveguides LW1 and LW2. A respective receiver EM1 and EM2 is shown at each of the two sides of the optical medium OM. These receivers are designed such that they can accept signals both from the transmitter SE1 as well as from the transmitter SE2. The measuring procedures sequence in the following way in detail:

Transmitter SE1 activated—Output Power P100
  a) Receiver EM1 coupled—Measurement of the Reception Level P101
  b) Receiver EM2 coupled—Measurement of the Reception Level P102
Transmitter SE2 Activated—Output Power P200
  a) Receiver EM1 coupled—Measurement of the Reception Level P201
  b) Receiver EM2 coupled—Measurement of the Reception Level P202.

In the way disclosed in greater detail in German Published Application 38 28 604 incorporated herein, the attenuation of the optical medium OM can be identified in an exact way from the measured values P101, P102, P201, and P202 received in this manner. In detail, the coupling of the respective measurement transmitter SE1 and SE2 occurs either via optical couplers, or these transmitters—when a through line is not involved—are directly connected to the face end of the light waveguides LW1 and LW2. By contrast, the receivers EM1 and EM2 are always connected to the light waveguides LW1 and LW2 via couplers, preferably flectional couplers.

SUMMARY OF THE INVENTION

The employment of two receivers for the implementation of the measurement is relatively involved. It is therefore an object of the invention to disclose a way how work can be simply carried out with lower expense, with only one measuring receiver, and wherein the measurement precision should not be deteriorated and a simple manipulation by the operating person can be guaranteed at the same time.

According to the invention, which is directed to a measuring device of the type initially cited, this object is achieved in that the two transmitters are attached to the measuring device at a distance from one another, in that a common receiver allocated to both transmitters is provided, and wherein the common receiver is held at the measuring device on the basis of a mechanical displacement or translation guide such that it can be optionally respectively topically allocated to one of the two transmitters.

The stationary arrangement of the two transmitters in the measuring device has the advantage that the necessary, freely accessible fiber length is clearly defined. Since work is now carried out with only a single, shared receiver, the expense at the receiver side is reduced to a minimum. What the mechanical displacement or translation guide guarantees is that the receiver always proceeds precisely into the desired position during the respective measuring event, so that the measurement itself is always implemented at approximately the same location and in the same way and manner at both sides of the optical medium, even given many successive measuring events. The displacement guide itself can be brought into the respective final position by the operator, or, on the other hand, can be automatically brought thereto with, for example, motor operators or the like.

A very important advantage is that the receiver no longer has to be symmetrical (an asymmetry according to the definitions of German Published Application 38 28 604, $C_{12}/C_{11} \cdot C_{21}/C_{22} = 1$, must be measured and corrected given two receivers). Given the solution having only one receiver, however, $C_{12}/C_{11} = C_{21}/C_{22}$ always derives because $C_{12} = C_{21}$ and $C_{11} = C_{22}$ are valid.

BRIEF DESCRIPTION OF THE DRAWINGS

FIG. 1 is an illustration of a prior art measuring device for measuring transmission properties of an optical medium;

FIG. 2 is a schematic illustration of a measuring device of the invention shown in a plan view;

FIG. 3 shows the measuring device of FIG. 2 in a side view;

DESCRIPTION OF THE PREFERRED EMBODIMENTS

Figure 4:
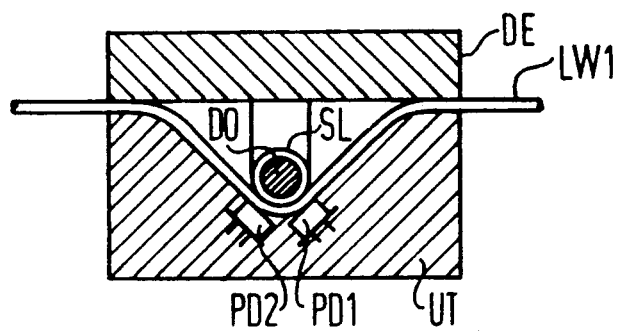
FIG. 4 illustrates structural details of the coupling means of the receiver in section.

The measuring device MV of FIGS. 2 and 3 is composed of a housing GH in which all component parts necessary for the implementation of the measurements are accommodated (not shown in greater detail here). At least one display means DP is provided on the cover surface DF (operating surface), the respectively obtained measuring result being displayed with this display means DP.

In addition, of course, an output on printers or the like can also occur. The two transmitters SE1 and SE2 are arranged at a distance from one another on the upper side of the cover surface DF of the measuring device MV and are preferably stationarily attached. Each of these transmitters SE1 and SE2 is accommodated in a block-shaped member (module unit) that is arranged on the cover surface DF. The connection toward the back to the housing GH occurs via plug devices. This makes it possible to design the transmitters as module units and to replace them as needed.

In the present exemplary embodiment, the coupling of the transmitters SE1 and SE2 occurs with flectional couplers in detail, whereby a lower part and an upper part designed in the form of a cover or of a flap is provided for each transmitter. The receiver EM12 is also designed as a module unit and is provided with a cover or with a flap in order to enable the placement of the light waveguide. Details about the structural design shall be set forth in greater detail with reference to FIGS. 4 and 5.

In the measuring condition, the respective light waveguides LW1 and LW2 are inserted at both the transmitter SE1 as well as the transmitter SE2, and the corresponding covers are closed. Both transmitters are thus coupled to the light waveguides LW1 and LW2 via the flectional couplers, whereby two operating possibilities result for the actual measurement:

a) The two transmitters SE1 and SE2 are successively activated, i.e. the transmitter SE1 is activated first and a signal P100 is fed into the light waveguide LW1 as a result thereof via the already existing flectional coupling. The receiver EM12 derives the signal P102 from this signal P100, whereby it is assumed in the present example of FIG. 2 that the receiver lies at the left of the optical unit under test OM, i.e. in the proximity of the transmitter SE1. After the implementation of the measurement with the signal P100 of the transmitter SE1, this is deactivated and the transmitter SE2 is activated instead. The measuring signal P200 is supplied into the light waveguide LW2 by this transmitter via the flectional coupling that already exists, and proceeds via the optical unit under test OM to the receiver EM12 which produces the measured signal P202 from the transmission signal P200.

b) It is also possible to simultaneously feed transmission signals from both transmitters SE1 and SE2 into the respective light waveguides LW1 and LW2 via the flectional couplers. For this purpose, for example, the two transmitters SE1 and SE2 can work with different frequency ranges for their measuring signals, so that the measured signals P102 and P202 of the receiver EM12 can be separated from one another and can be interpreted independently of one another.

A second measurement occurs after the implementation of the measurement with the receiver EM12 at the side and to the left of the optical unit OM under test. For this purpose, the receiver EM12 is brought into the position EM12' shown with broken lines, this line being to the right of the optical unit under test OM and approaching the transmitter SE2. The receiver in the position EM12' derives the reception signal P101 from the transmission signal P100 of the transmitter SE1, whereas the reception signal P201 is acquired from the transmission signal P200 of the transmitter SE2. The attenuation of the optical unit under test OM can be identified in the way disclosed in German Published Application 38 28 604 from the total of four measured values P102, P202 and P101, P201 of the common receiver EM12 which are obtained.

The infeed conditions during the entire measuring time, i.e. during the measurement at the left and right of the optical unit under test OM, must be kept the same for the transmitters SE1 and SE2. For this reason, the light waveguides LW1 and LW2 remain lying in the coupling devices when the covers or flaps are closed and the flectional coupling is therefore unmodified in both instances, even when the receiver EM12 is displaced into the position EM12'. The flap or the cover is in fact opened at the receiver EM12 in order to be able to implement this mechanical displacement; this, however, remains without influence because the value pairs P202 and P102 at the left-hand side and P101 and P201 at the right-hand side are respectively acquired under the same coupling conditions, since an opening of the cover from one measuring event, for example P102, to the next measuring event P202, does not occur.

A displacement guide is provided for moving the common receiver EM12 into the two working positions, this displacement guide being designed in the form of an arm AR in the present case which is pivotable around a swiveling axis DA. The arm AR can also be arranged entirely or, as warranted, partially lowered, in the interior of the housing GH (i.e., lowered below the cover surface DF). The inside thereof contains the connecting lines for the receiver EM12. The motion of the receiver EM12 thus occurs on a circular path and it is therefore necessary to also arrange the two transmitters SE1 and SE2 such that they lie transversely (radially) relative to the path of motion of the receiver EM12, i.e. transversely relative to a circle having the common center in DA in the present example. This has the particular advantage that the transmitters SE1 and SE2 each respectively proceed roughly parallel to the receiver EM12 in both measuring positions, so that the light waveguides LW1 and LW2 are not subjected to any buckling, but likewise come to lie on a line shaped approximately like a circular arc.

Instead of a guide arm AR, any other mechanical guide of the common receiver can also be employed, for example a guide on at least one rail (indicated in FIG. 2 by the guide rail FS shown with broken lines), a link motion guide, or the like.

It is expedient to arrange the coupling devices of the two transmitters SE1 and SE2 in respective alignment with the coupling device of the common receiver EM12, namely with reference to the respective ultimate measuring position as shown in FIG. 2 at the left for the receiver EM12 and at the right for the position EM12'. In the ultimate position (measuring position) of the common receiver EM12, thus the respective light waveguide LW1 and LW2 proceeds on a uniform, steady path which does not have any sharp bends or the like.

The height of the entrance and exit location of the light waveguides above the cover surface DF of the measuring device MV should also be expediently selected such that the light waveguides LW1 and LW2 proceed at the same spacing, i.e. the entrance locations and the exit locations at those sides of the transmitters SE1 and SE2 and of the common receiver EM12 facing toward one another lie at the same height above the cover surface DE.

FIG. 3 shows a section through the measuring device MV of FIG. 2 along the line III—III. The receiver EM12 is in its reception position (allocated to the transmitter SE1) and lies against the cover surface DF. The receiver EM12 comprises a lower part UT and a cover DE, whereby the latter is shown in its closed condition and therefore retains the light waveguide LW1 in the introduction opening.

When the optical medium OM lies on the cover surface DF of the measuring device MV, or is secured thereto (this, for example, can be the case when OM represents a splice and the electrodes of a light waveguide welding means are still present at both sides of OM), then it is expedient to also provide the arm AR at the turning arm DA so it is pivotable in a vertical direction as well. Thus, the optical medium OM can be conducted upwardly over the optical medium OM when transferring from the position shown in FIG. 2 into the position EM12' shown in broken lines. The position assumed by the receiver EM12 and by the arm AR during this transition is shown in broken lines in FIG. 3.

It can also be expedient to arrange the transmitters SE1 and SE2 movable to a certain extent on the cover surface DF of the measuring device MV, whereby, however, a certain rotation around a pivot point is normally adequate. Pivoting, as in the case of the receiver EM12, is not necessary.

FIG. 4 shows a section through a receiver EM12, whereby the section plane lies exactly where the respective light waveguide, for example LW1, proceeds. The lower part UT comprises a depression in its middle region at whose lower end the sensors serving the purpose of picking up the reception signals, i.e. particularly photodiodes PD1 and PD2, are arranged. The photodiode PD2 picks up signals that come from the right, whereas the photodiode PD1 receives signals which arrive from the left via the light waveguide LW1. A mandrel or arbor DO preferably having a circular cross section is indicated at the under side of the cover DE shown in its closed condition, this mandrel pressing the light waveguide LW1 in the measuring position precisely into the depression of the lower part UT and thereby guaranteeing a defined outfeed of a part of the transmission signals P100 or P200 of the transmitters SE1 or SE2.

Figure 5:
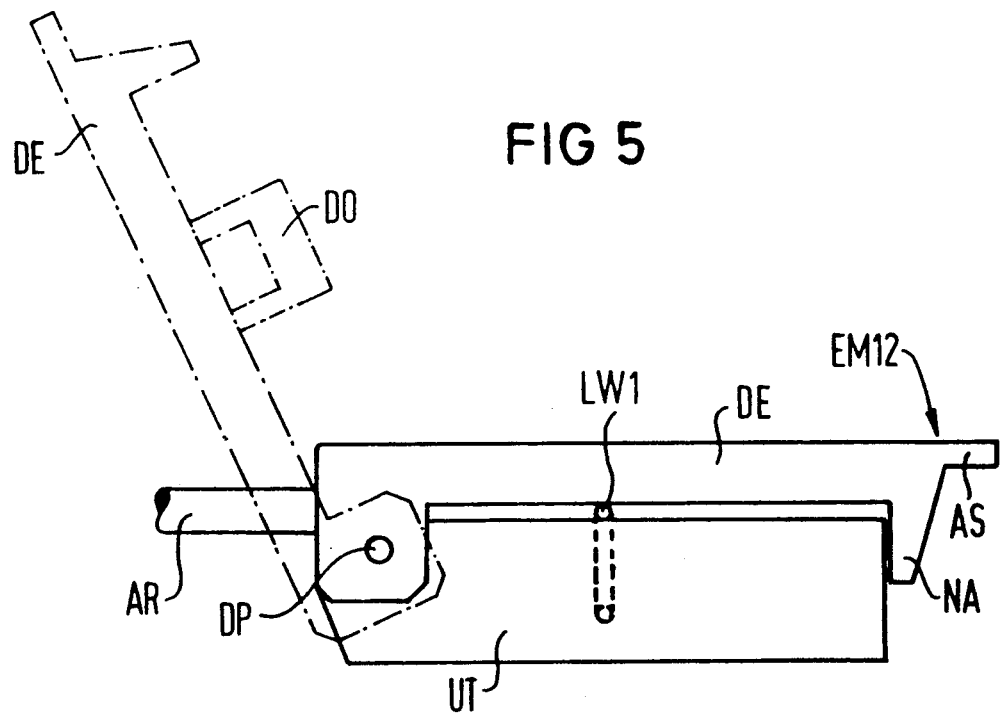
FIG. 5 shows the coupling means for the receiver in a side view.

As may be seen from FIG. 5, the cover DE overlaps the lower part UT with a nose NA and comprises a projection AS via which the operator can effect the opening and closing in a simple way. The cover DE is rotatably seated at the left-hand end via an axle DP and can be brought into the position shown with broken lines for introducing or removing the light waveguide LW1. As already mentioned, the coupling devices of the two transmitters SE1 and SE2 expediently have the same external structure, so that a total of three corresponding coupling devices of the same type and having the same operating mode are available for the user.

Figure 6:
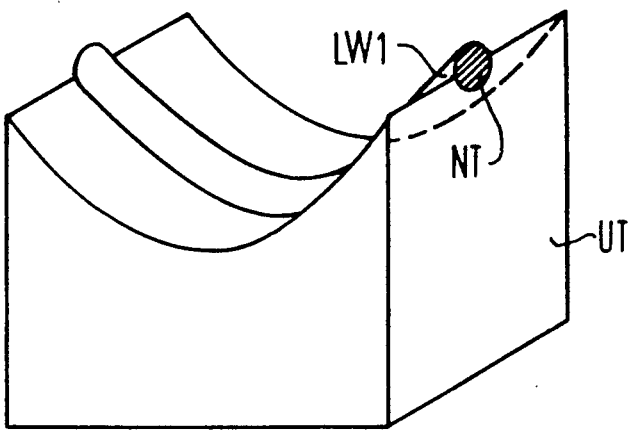
FIG. 6 illustrates a coupling means comprising a channel.

An improvement of the guidance of the light waveguide, for example LW1, in the lower part UT, is achieved by a channel MP according to FIG. 6, this channel NT being worked into the curved, upper cover surface of the lower part UT. The depth of this channel NT is selected such that the light waveguide upwardly projects a certain distance above the channel, so that the mandrel DO of FIG. 4 correspondingly presses against the light waveguide LW1. The mandrel DO having a circular cross section can be advantageously covered with a hose SL (see FIG. 4) which is composed of an elastically resilient material, particularly of silicone. Instead of a hose SL, coating the mandrel with a corresponding coating material, for example with a synthetic resin or silicon, can also be carried out. The interaction of the channel NT and of the hose SL on the mandrel DO assures an especially well-reproducible position of the light waveguide LW1 in the coupling means. It must thereby be noted that the light waveguide LW1 is still provided with its coating, so that the material of the hose SL of the mandrel DO presses against the coating of the light waveguide LW1. A yielding of the coating of the light waveguide LW1 under the pressure of the mandrel DO is avoided, or at least reduced, to a certain extent as a result of the enlarged seating surface of the light waveguide LW1 in the bottom of the channel NT. This is particularly true in comparison to embodiments wherein the round light waveguide LW1 presses against a foundation, for example UT, at only one side (so to speak, tangentially) and likewise comes into contact practically only tangentially with the surface of the mandrel DO at the opposite side.

Figure 7:
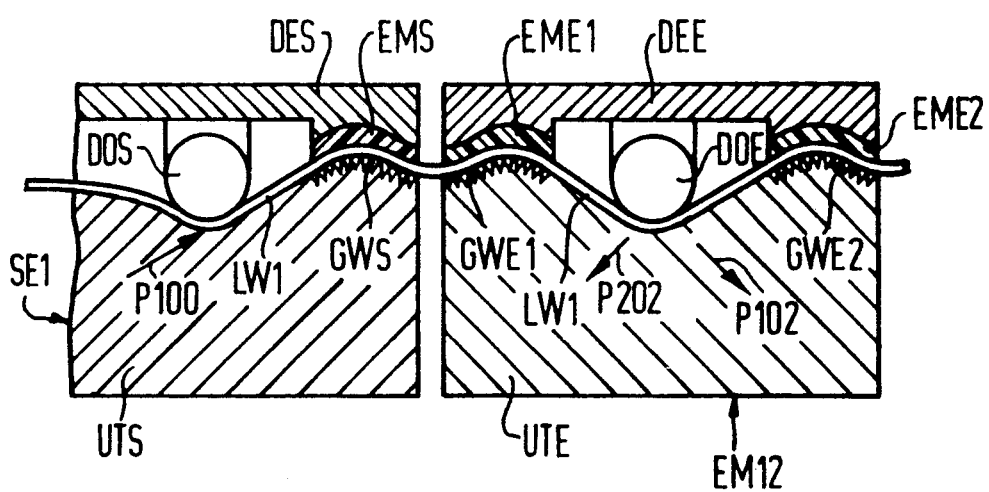
FIG. 7 shows the arrangement of a mode stripper.

A further improvement in the measuring precision is possible by utilizing a mode stripper in the infeed or outfeed devices of the transmitters SE1 and SE2, and of the common receiver EM12. According to the left-hand part of FIG. 7, an undulating guidance of the light waveguide LW1 is undertaken at the transmitter SE1 or SE2 following the flectional coupler (composed of mandrel DOS and lower part UTS). For this purpose, an undulating surface GWS of the lower part UTS is provided at the output side, whereby the corresponding cover DES of the transmission coupling unit is coated with an elastic material EMS. When the cover DES is closed, the light waveguide LW1 is deformed due to the undulating guide GWS such that a stripping of sheath modes that would otherwise effect a falsification of the measured result occurs.

It is expedient to also provide such an undulating guide GWE1 and GWE2 at the receiver EM12 as well, namely at both sides of the coupling device or of the mandrel DOE, whereby two layers EME1 and EME2 of elastic material are also provided.

Although various minor changes and modifications might be proposed by those skilled in the art, it will be understood that we wish to include within the claims of the patent warranted hereon all such changes and modifications as reasonably come within our contribution to the art.

We claim as our invention:

1. A measuring device for an optical medium, comprising:
   first and second spaced apart transmitters with an optical medium between and coupled to the two transmitters;
   a common receiver allocable to either of both transmitters; and
   mechanical displacement guide means for holding and optionally positioning and guiding the common receiver along a defined path to either of two measuring positions so that the receiver can be positionally allocated to either one of the two transmitters.

2. A measuring device according to claim 1 wherein said mechanical displacement guide means positions the common receiver so that it is approximately parallel to the respective transmitter when it is in a respective measuring position and allocated to one of the two transmitters.

3. A measuring device according to claim 1 wherein light waveguide coupling means is provided for coupling the optical medium to the transmitters and the common receiver.

4. A measuring device according to claim 3 wherein the transmitters and common receiver are positioned along a common path.

5. A measuring device according to claim 1 wherein the mechanical displacement guide means comprises an arm connected to a portion of the measuring device and wherein the arm is pivotable around a swiveling axis.

6. A measuring device according to claim 1 wherein the displacement guide means comprises at least one rail on which the common receiver is movably guided.

7. A measuring device according to claim 1 wherein the displacement guide means has means for permitting a lifting of the common receiver.

8. A measuring device according to claim 1 wherein the common receiver at its respective measuring positions and the transmitters all lie on a common surface of the measuring device.

9. A measuring device according to claim 1 wherein the common receiver has a lower part and a cover and wherein the optical medium connects to the common receiver via a light waveguide which passes between the lower part and the cover and is coupled to the light waveguide when the cover is closed when the common receiver is located at a respective position.

10. A measuring device according to claim 1 wherein the two transmitters and the common receiver have identical coupling means for coupling to the optical medium.

11. A measuring device according to claim 1 wherein the optical medium connects to the transmitters and receiver via light waveguide means and wherein the two transmitters and receiver have a lower part and a movable cover between which a portion of the waveguide means is positioned, and wherein the lower part has a channel means for receiving the portion of the light waveguide means.

12. A measuring device according to claim 1 wherein at least one of the transmitters and common receiver comprise a lower part and a movable cover, wherein the optical medium comprises a light waveguide which connects to the at least one of the two transmitters and receiver via a light waveguide positioned between the cover and the lower part, and wherein a coupling device is provided between the cover and the lower part.

13. A measuring device according to claim 12 wherein the coupling device comprises a depression in the lower part and a flection member means for pressing the light waveguide into the depression of the lower part, and wherein optical means is provided in the depression adjacent where the light waveguide is pressed.

14. A measuring device according to claim 13 wherein the pressing means comprises a mandrel.

15. A measuring device according to claim 13 wherein mode stripping means is provided in a region of the coupling device.

16. A measuring device according to claim 15 wherein the mode stripping means comprises an elastic material at an upper surface of the cover and an undulating surface in the lower part adjacent the elastic material.

17. A measuring system for measuring transmission properties of an optical medium, comprising:
first and second spaced apart transmitters with the transmitters each having means for coupling the optical medium to the two transmitters, and the transmitters being attached to a common mounting surface of the measuring device;
a common receiver on the mounting surface and used in conjunction with both transmitters, and having means for coupling the optical medium to the common receiver; and
a mechanical displacement guide means for holding and optionally positioning the common receiver by guiding it along a defined path for positioning at either of two measuring positions on the common surface so that it can be positionally allocated to either one of the two transmitters.

18. A measuring system according to claim 17 wherein the coupling device means comprises the common receiver being formed of a lower part and a cover receivable over the lower part, and wherein a depression is provided in the lower part and pressing means is provided on the cover which, when the cover is placed over the lower part, presses the light waveguide into the depression, and wherein light sensor means are provided in the depression for sensing light passing through the light waveguide in the depression.

19. A measuring system for determining optical transmission properties of an optical medium, comprising:
first and second spaced apart transmitters with the optical medium between and coupled to the two transmitters;
a common receiver allocated to both transmitters; and
a mechanical displacement guide means for optionally positioning and guiding the common receiver along a defined path so that the receiver can be positioned at either of two respective measuring positions adjacent to either one of the two transmitters.

* * * * *